United States Patent [19]

Gonzalez-Lopez et al.

[11] Patent Number: 4,855,938
[45] Date of Patent: Aug. 8, 1989

[54] HIDDEN LINE REMOVAL METHOD WITH MODIFIED DEPTH BUFFER

[75] Inventors: Jorge Gonzalez-Lopez, Red Hook; Bob C. Liang, Hurley, both of N.Y.

[73] Assignee: International Business Machines Corporation, Armonk, N.Y.

[21] Appl. No.: 115,455

[22] Filed: Oct. 30, 1987

[51] Int. Cl.$^4$ ............................................. G06F 15/68
[52] U.S. Cl. .................................. 364/522; 364/521; 340/747
[58] Field of Search ....................... 364/521, 522, 518; 340/747, 750, 724, 729; 382/41

[56] References Cited

U.S. PATENT DOCUMENTS

| | | | |
|---|---|---|---|
| 4,222,048 | 9/1980 | Johnson | 340/747 |
| 4,594,673 | 6/1986 | Holly | 364/522 |
| 4,609,917 | 9/1986 | Shen | 340/729 |
| 4,609,993 | 9/1986 | Shimizu | 364/522 |
| 4,625,289 | 11/1986 | Rockwood | 364/522 |
| 4,684,990 | 8/1987 | Oxley | 358/183 |
| 4,697,178 | 9/1987 | Heckel | 340/720 |
| 4,719,585 | 1/1988 | Cline et al. | 364/518 |
| 4,730,261 | 3/1988 | Smith | 364/521 |

OTHER PUBLICATIONS

Sutherland et al. "A Characterization of Ten Hidden—Surface Algorithims" Tutorial Computer Graphics COMPCON 79, pp. 293-347.
"Fundamentals of Interactive Computer Graphics" by Foley and Van Dam, published by Addison-Wesley Publishing Company (1982), pp. 560-561.

Primary Examiner—Gary v. Harkcom
Assistant Examiner—Phu K. Nguyen
Attorney, Agent, or Firm—Mark S. Walker; J. Dennis Moore

[57] ABSTRACT

Polygon vertex data is processed in three steps to create a graphics display without hidden lines and without gaps in the displayed lines. The technique permits the processing of triangles rather than polygons having four or more sides. In the first step, the Z values for the display points for the visible edges of the polygons are identified and assigned a reserved value ZCLOSE in a frame buffer. In the second step, the polygons are tessellated into triangles and the Z values for the display points on the triangles are computed and each depth buffer storage location is updated so as to contain the value of points closest to the viewpoint while the frame buffer is written with a background color. In the final step, the Z values for the display points of the polygon edges are again computed and compared with the corresponding Z values in the depth buffer. The depth buffer is updated with the computed values if the stored value is equal to ZCLOSE or if the computed value represents a position closer to the viewpoint than the stored value and the frame buffer is then written with a foreground color for the display point in question.

4 Claims, 2 Drawing Sheets

HIDDEN LINE REMOVAL METHOD WITH MODIFIED DEPTH BUFFER

BACKGROUND OF THE INVENTION

1. Field of the Invention

The present invention relates to computer graphics generation and display, and more particularly, to a method and apparatus for removing hidden lines in a wire-frame model to be displayed on a graphics terminal. The invention also involves related improvements in depth buffer design.

2. Description of the Background Art

Computer graphics display systems typically derive images from digital data stored in the form of points in a three-dimensional coordinate system, wherein the points correspond to the vertices of polygons. The polygons form the "building blocks" of larger objects which are the ultimate display objects. The vertex data stored in the system's memory includes positional data in a three-dimensional coordinate system in which, for example, the X and Y axes define a view plane and the Z axis represents distances from the view plane. In the generation of an actual graphics display, the polygons defining the object to be displayed are projected onto the view plane. To remove hidden lines, a standard depth buffer technique is often used in which the Z values of each projected point are determined and compared. For any given display point on the view plane having a corresponding storage location in the depth buffer and the frame buffer of the system, the point chosen for display will be that which is closest to the viewpoint. Thus, for example, in the generation of a wire-frame model of an object, the edges of the polygons closest to the viewpoint will be displayed while those hidden by closer polygons will not. This prior art technique is generally described in "Fundamentals of Interactive Computer Graphics" by Foley and Van Dam, Addison-Wesley Publishing Company, Inc. (1982) at pages 560–61.

The prior art approach described above to the problem of hidden line removal in wire-frame models works well when the polygons are processed as polygons. However, as those skilled in the art know, it is preferably to process triangles rather than polygons having four or more sides because processing triangles lends itself more readily to the use of specialized hardware. Unfortunately, the above-described approach to the problem of hidden line removal is not suitable where the polygons defining the object are tessellated into triangles and the triangles are then processed. Due to the fact that certain display points can be identified as belonging to a polygon edge which would be displayed with a foreground color while the same points can also be identified as being points on one of the tessellated triangles of a given polygon which would be written in a background color, there are certain situations in which the wrong decision will be made and a gap will appear in the display of the polygon edge. This problem will be more particularly described below.

The invention described herein overcomes the stated problem. It involves a new technique as well as improved hardware for its implementation.

Thus, it is an object of this invention to provide an improved technique for creating wire-frame graphic displays without hidden lines which involves the computer processing of triangles rather than polygons having four or more sides.

It is a further object of this invention to provide a method and an apparatus of the type stated in which the visible edges of polygons defining an object are displayed without any gaps therein.

SUMMARY OF THE INVENTION

Briefly described, the method of this invention involves the processing of polygon vertex data in three major steps. In the first step, the Z values for display points belonging to a visible polygon edge are computed and compared with the Z value currently stored in a depth buffer. If the computed Z value represents a position closer to the viewpoint than the stored value, then the depth buffer is updated with a reserved Z value designation such as ZCLOSE which preferably represents the closest position to the viewpoint which can be displayed by the system. In the second step, the polygon being processed is tessellated into triangles and the Z values for each point on the triangles are computed, excepting such points as belong to the edge of the polygon. Each computed Z value is compared with the corresponding value then stored in the depth buffer and, if the computed value represents a position closer to the viewpoint, the depth buffer is updated with the computed value and the frame buffer is written with a background color. In the third step, the Z values for the display points belonging to the polygon edges are again computed and compared with values currently stored in the depth buffer. If the depth buffer value is equal to ZCLOSE or if the computed value represents a position closer to the viewpoint than the stored value, the depth buffer is updated with the computed Z value and the frame buffer is written with a foreground color.

The apparatus of this invention comprises a controller and associated components in a hidden line removal subsystem arranged to execute the above-described method.

DETAILED DESCRIPTION OF THE PREFERRED EMBODIMENT

Figure 1:
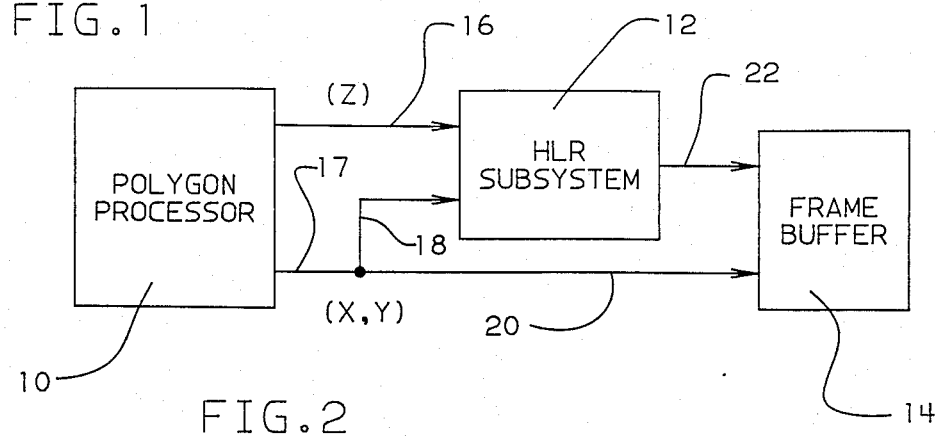
FIG. 1 is a block diagram showing the relationship of the hidden line removal subsystem with some of the other components in a display processor.

Referring first to FIG. 1 there is shown a polygon processor 10 having output data paths 16 and 17. A hidden line removal subsystem 12 receives data from polygon processor 10 via paths 16 and 17, 18. HLR subsystem 12 outputs data via data path 22 to frame buffer 14. Frame Buffer 14 also receives data via path 17, 20.

It should be understood that the components described in FIG. 1 are part of a display processor of a graphics display system. Polygon processor 10 receives data from other system components (not shown) in the form of vertex information describing a series of related polygons which together define an object to be displayed. These polygons will have already been transformed and clipped using standard techniques and apparatuses. Polygon processor 10 is used to map the polygons on the screen coordinate system in a well-known manner so as to provide positional data in the form of X and Y values on its output data path 17 and Z values corresponding to each X,Y position. The X,Y data serves to define a particular display point on a mathematical view plane, each such point having a corresponding storage location in frame buffer 14 and in a depth buffer contained in HLR subsystem 12. The Z values give the positional relationship between the view plane and a particular point on the three-dimensional object being projected for a given X,Y location on the view plane. As mentioned above, each such point being projected is located on one of the polygons defining the object.

In the generation of a wire-frame model of an object for display, the visible edges of the polygons defining the object are presented in the display in a foreground color and points interior to the polygons are presented in a background color. Naturally, the display is more realistic if hidden lines are not visible in the display. "Hidden lines" are understood to mean those polygon edges which would not be seen from the chosen viewpoint due to the interposition of other polygons between the viewpoint and the line in question. The purpose of HLR subsystem 12 is to remove hidden lines in the display using a depth buffer technique. Thus, the output from HLR subsystem 12 on data path 22 is intended to give the appropriate color information, i.e., either background or foreground, for each X,Y location as it is processed and to write that information into the frame buffer 14.

Figure 3:
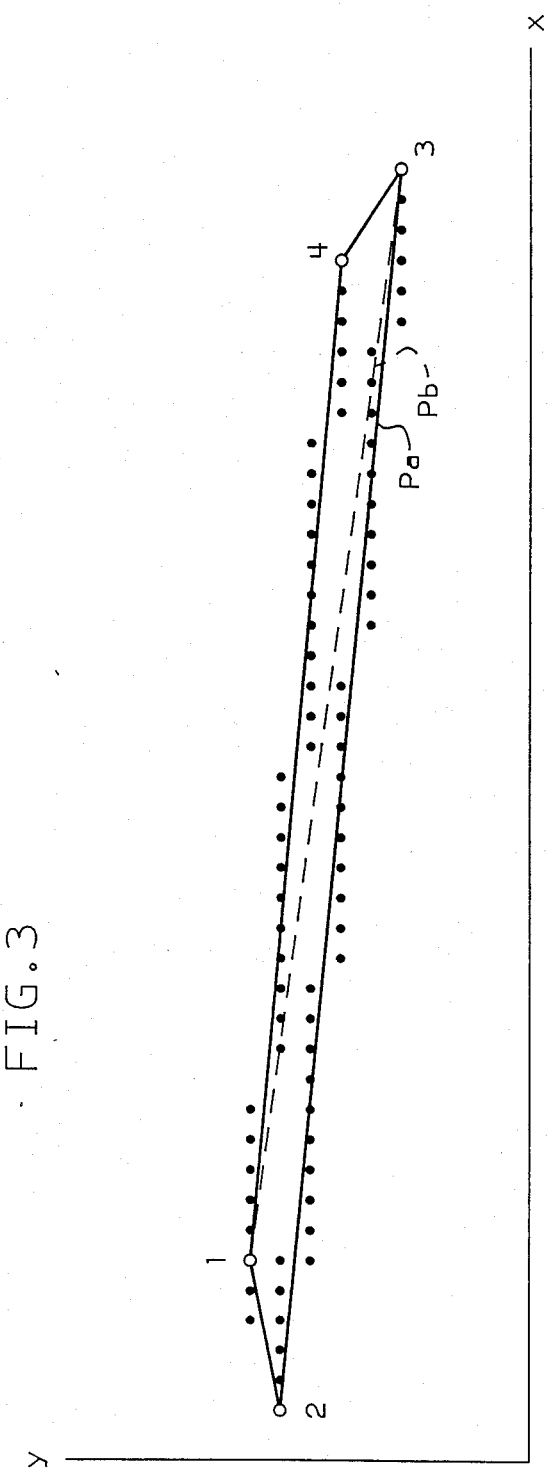
FIG. 3 is a graphical representation of the problem solved by this invention.

Before discussing the technique and apparatus of this invention in greater detail, reference is made to FIG. 3 for a discussion of the problem solved and the improvement made by the subject invention. As noted earlier, it is simpler to process triangles rather than polygons in preparing graphic displays. Thus, it is desirable to tessellate the polygons into triangles as described, for example, in "A Three-D Graphic Display System With Depth Buffer and Pipeline Processor", by A. Fugimoto, et al., IEEE CG & A. (June 1984) Page 11. However, when prior art techniques are applied in processing these tessellated triangles, a problem sometimes results due to the fact that a display point on the display device may belong to a polygon edge and at the same time be an interior point of a triangle being processed. If the polygon edge happens to be a visible one, the point should be written in the frame buffer with a foreground color. But if the point is processed last as an interior point of the triangle and if its Z value therein represents a position closer to the viewpoint than its position as an edge point, it would be given a background color value, assuming prior art techniques are used.

To more clearly appreciate this problem, consider polygon 1-2-3-4 shown in FIG. 3. It has been tessellated into triangles 1-2-3 and 1-3-4. "Tessellation" simply means that where the vertices of a polygon having four or more sides are to be processed, the vertices are processed in combinations of three at a time in a methodical sequence so that one can deal with triangles rather than with other types of polygons. Suppose triangle 1-2-3 is processed first and that its edge 2-3 is a visible one. Using Bresenham's algorithm or a similar approach, a number of points including Pa and Pb, will be identified as belonging to edge 2-3. However, when triangle 1-3-4 is processed, points Pa and Pb, which are internal to the triangle will be written in a background color if they happen to have Z values representing positions closer to the viewpoint than the Z values currently stored in the depth buffer. This can occur when, for example, vertex 4 is closer to the viewpoint than the other vertices.

This invention solves the above-described problem through the use of a technique which involves electronically segregating display points belonging to a polygon edge from other points. In its preferred embodiment, the technique requires that each projected polygon be individually processed in three passes. In the first pass, the display points belonging to the edges of the polygon are identified using any well-known technique such as Bresenham's algorithm. The Z value of each such display point is computed in any suitable manner and compared with the Z value currently stored in the depth buffer for that display point. If the computed Z value represents a position closer to the viewpoint than the stored value, the depth buffer is updated with the value ZCLOSE. ZCLOSE is chosen to be a reserved value, that is, one which may not be seen in the mathematical definition of the object to be displayed. Thus, the Z values for the object may not include the reserve value. The reserve value can theoretically be any Z value, but in our preferred embodiment, ZCLOSE represents the value closest to the viewpoint which the system is capable of displaying. It will be appreciated that by assigning the reserved value ZCLOSE to display points belonging to visible polygon edge lines, those display points are effectively masked during the second pass when the triangles are being processed.

In the second pass of our preferred technique, the polygon under consideration is tessellated into a set of triangles as shown, for example, in FIG. 3. For each triangle, the Z value to be associated with each of its display points is computed and compared with the value currently stored in the depth buffer. If the computed value represents a position closer to the viewpoint than the stored value, the depth buffer is updated with the computed value and the frame buffer is written with a background color. Since no point on the object will be allowed to have a Z value equal to ZCLOSE, there is no danger that a display point for the triangle which happens to also be a point belonging to an edge of the polygon under consideration will be written with a background color. It will be appreciated from the foregoing that polygon edge points are given priority over other points in this invention.

In the third pass, the Z values of the display points belonging to the polygon edges are again computed and compared with stored values. If (1) the stored value for a given display point is equal to ZCLOSE or if (2) the computed value represents a position closer to the viewpoint than the stored value, then the depth buffer is updated with the computed value and the frame buffer is written with a foreground color. Otherwise, no action is taken. It is necessary to include the second condition because certain polygons, those with at least one very small interior angle, can have two edges so close together that the display points for one may also be display points for the other. In such cases, preference is to be given to the Z value closest to the viewpoint.

Figure 2:
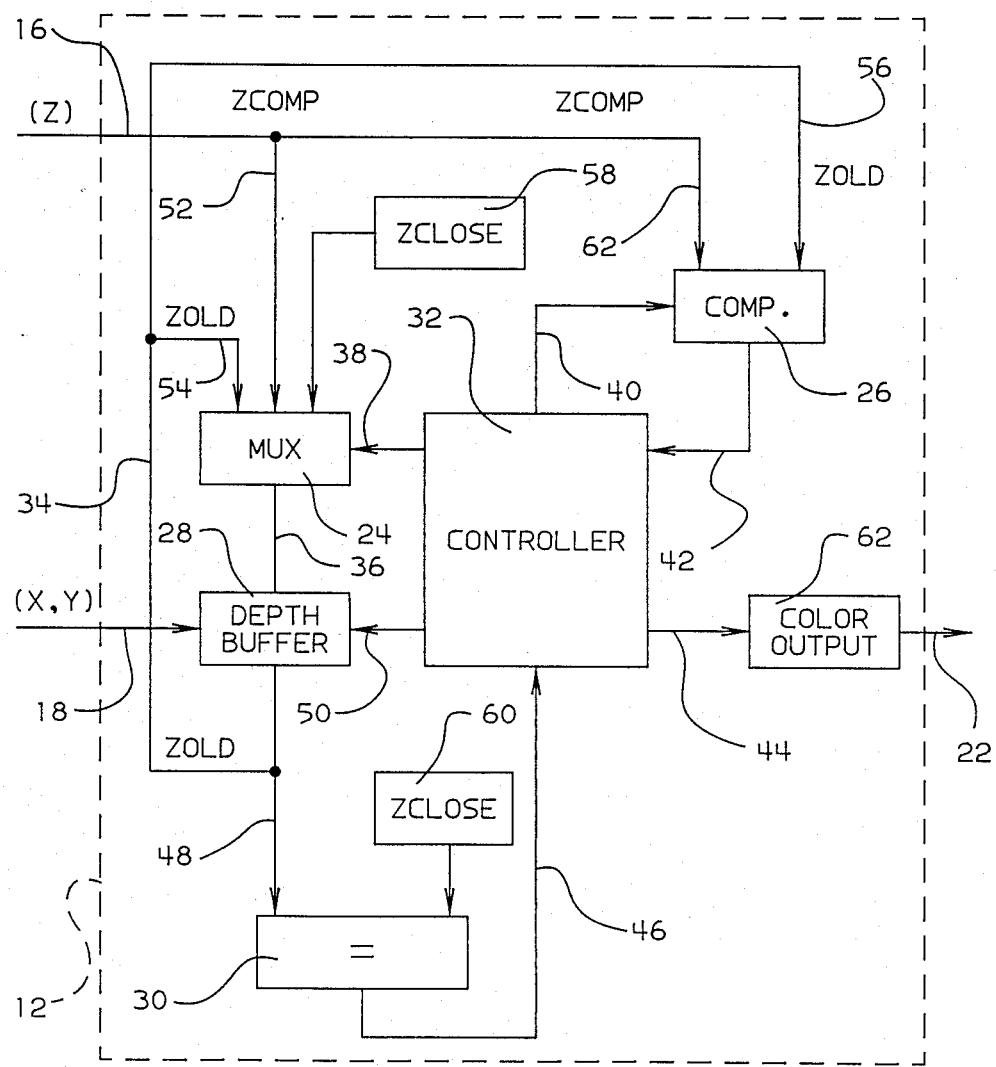
FIG. 2 is a more detailed block diagram showing the components contained in the hidden line removal subsystem of FIG. 1.

The hardware required in the application of this technique in the preferred embodiment of this invention is illustrated in FIG. 2. There it will be seen that the Z values of display points under consideration are fed via data path 16, 52 into a multiplexer 24 and via path 16, 62 to a comparator 26. Corresponding X,Y data identifying the particular display point under consideration is fed into depth buffer 28 via path 18. The Z value currently stored in depth buffer 28 for a particular display point under consideration is fed via lines 34, 54 to multiplexer 24 and path 34, 56 to the comparator 26. This information is also fed via path 48 to equality detector 30.

Registers 58 and 60 associated with multiplexer 24 and equality detector 30, respectively, are initialized with the Z value ZCLOSE, thus continuously presenting that value as an input to those devices during the operation of the invention. The output of multiplexer 24 is fed via path 36 to depth buffer 28. The output of comparator 26 is fed via path 42 to a controller 32. Controller 32 controls the operation of multiplexer 24 via path 38, depth buffer 28 via path 50 and comparator 26 via path 40. The output from equality detector 30 is fed into controller 32 via path 46. Controller 32 provides control signals to a color output device 62 which may be any suitable device for selectively providing standard background or foreground color data in the form required by frame buffer 14 of FIG. 1. This data is provided via path 22.

The controller may be any suitable device such as a microprocessor capable of being programmed to execute the microcode which is attached hereto as Appendix A and made a part hereof. However, as those skilled in the art will readily appreciate, the invention can be most economically and conveniently implemented using standard hard wired logic techniques and devices.

The operation of the HRL subsystem 12 will now be described. Incoming computed Z values on path 62 (ZCOMP) are compared with currently stored values on path 56 (ZOLD) in comparator 26. The output from comparator 26 is fed to controller 32 via path 42. Multiplexer 24 offers a choice of three inputs to the X,Y location in depth buffer 28 for the display point under consideration. During the first pass when polygon edge points are being considered, if the computed Z value (ZCOMP) represents a position closer to the viewpoint than the stored value (ZOLD), the controller 32 will cause the value ZCLOSE to be transferred to the storage location for the display point under consideration in depth buffer 28 by sending an appropriate signal to multiplexer 24 via path 38 and to the depth buffer via path 50. During the second pass, comparator 26 again makes the comparison between the computed Z value (ZCOMP) and the currently stored value (ZOLD) and transmits appropriate data indicative of the results to controller 32. This time, however, controller 32, by signals on path 38, will select the computed value (ZCOMP) as the output of multiplexer 24 for updating depth buffer 28 if the comparator has indicated that ZCOMP represents a position closer to the viewpoint. Otherwise, controller will select ZOLD for transmission to the depth buffer which, of course, causes no change in its stored value. The control data provided to depth buffer 28 via path 18 coordinates the operation of the depth buffer so that the appropriate X,Y display point storage location is accessed as each Z value is considered. During the third pass when polygon edge points are again being considered, computed Z value (ZCOMP) will be transmitted on command from controller 32 via path 36 to the depth buffer, if the stored value (ZOLD) equals ZCLOSE or if the computed Z value (ZCOMP) represents a position closer to the viewpoint than the stored value (ZOLD). Controller 32 receives data indicating whether the stored value (ZOLD) equals ZCLOSE from equality detector 30 via path 46 and, as before, it receives data concerning the ZCOMP/ZOLD comparison from comparator 26 via path 42. The controller 32 also causes the color output device 62 to write the frame buffer with a background color or a foreground color at appropriate times during the process as indicated earlier.

The scope of the above-described invention is defined by the claims appended hereto and various modifications can be made without departing from the scope of those claims. For example, in the preferred embodiment, one might choose to write the frame buffer with a foreground color in step 2 (c) rather than in step (g). Quite clearly, the configuration of devices shown in FIG. 2 could be reorganized and/or combined with other devices in the display processor to perform functions, such as shading, in addition to those functions described herein. It is intended to encompass all such variations and modifications within the scope of the following claims.

APPENDIX A
MICROCODE DESCRIPTION OF "CONTROLLER"

```
IF FIRST PASS
THEN BEGIN;
Set comparator for output true if ZCOMP >= ZOLD;
/* (ZCOMP closer than ZOLD) */
FOR each point (X,Y) DO;
IF comparator output is true
THEN DO;
Set MUX to select ZCLOSE;
Generate write signal to depth buffer;
END;
ELSE DO;
Set MUX to select ZOLD;
Generate write signal to depth buffer;
END;
END;
END
IF SECOND PASS
THEN BEGIN;
Set comparator for output true if ZCOMP >= ZOLD;
/* (ZCOMP closer than ZOLD) */
FOR each point (X,Y) DO;
IF comparator output is true
THEN DO;
Set MUX to select ZCOMP;
Generate write signal to depth buffer;
Set control signal to "Color Output" to background.
Generate write signal to frame buffer;
END;
ELSE DO;
Set MUX to select ZOLD;
Generate write signal to depth buffer:
END; .
END;
END;
IF THIRD PASS
THEN BEGIN;
Set comparator for output true if ZCOMP >= ZOLD;
/* (ZCOMP closer than ZOLD) */
FOR each point (X,Y) DO;
IF quality detector output is true
OR if comparator output is true
THEN DO;
Set MUX to select ZCOMP;
Generate write signal to depth buffer;
Set control signal to "Color Output" to foreground.
Generate write signal to frame buffer;
END;
ELSE DO;
Set MUX to select ZOLD;
Generate write signal to depth buffer;
END;
END;
END;
```

We claim:

1. A method for producing a wire-frame graphics display in two dimensions and without hidden lines in a graphics display system having a depth buffer and a frame buffer each containing a storage location for each displayable point on said display system, said display to be as it would appear from a chosen viewpoint and said display to be produced from data representing the vertices of a set of polygons defining a three-dimensional object and its projection onto a view plane, said method comprising the steps of:

(1) initializing each location in the depth buffer to a depth value corresponding to the farthest position from the viewpoint which can be displayed by the system and reserving the value ZCLOSE representing the closest position to the viewpoint which can be displayed by the system;

(2) processing each projected polygon in turn in the following way:
 (a) computing the depth value of each point on each polygon edge and its corresponding storage location in the depth buffer;
 (b) comparing each computed depth value with the value then stored in the corresponding depth buffer storage location;
 (c) replacing the corresponding depth buffer value with the value ZCLOSE if the computed depth value represents a position closer to the viewpoint than the stored value;
 (d) tessellating the polygon into a set of triangles;
 (e) for each triangle:
  (i) computing the depth value of each point of the triangle and its corresponding storage location in the depth buffer;
  (ii) comparing each computed depth value with the value then stored in the corresponding depth buffer storage location;
  (iii) replacing the corresponding depth buffer value with the computed depth value and writing the frame buffer with a background color value if the computed depth value represents a position closer to the viewpoint than the stored value;
 (f) computing a second time the depth value of each point on each polygon edge and its corresponding storage location in the depth buffer;
 (g) comparing said second computed depth value with the value then stored in the corresponding depth buffer storage location;
 (h) replacing the depth buffer value with the second computed depth value for said polygon edge point and writing the frame buffer with a foreground color value if the value then stored therein is equal to ZCLOSE or if the second computed depth value represents a position closer to the viewpoint than the stored value.

2. Apparatus for producing a wire-frame graphics display in two dimensions and without hidden lines in a graphics display system having a depth buffer and a frame buffer each containing a storage location for each displayable point on said display system, said display to be as it would appear from a chosen viewpoint and said display to be produced from data representing the vertices of a set of polygons defining a three-dimensional object and its projection onto a view plane, said apparatus comprising:

(1) means for initializing each location in the depth buffer to a depth value corresponding to the farthest position from the viewpoint which can be displayed by the system and reserving the value ZCLOSE representing the closest position to the viewpoint which can be displayed in the system;

(2) means for processing each projected polygon comprising:
 (a) means for computing the depth value of each point on each polygon edge and its corresponding storage location in the depth buffer;
 (b) means for comparing each computed depth value with the value then stored in the corresponding depth buffer storage location;
 (c) means for replacing the corresponding depth buffer storage location with the value ZCLOSE if the computed depth value represents a position closer to the viewpoint than the stored value;
 (d) means for tessellating the polygon into a set of triangles;
 (e) means for processing each triangle comprising:
  (i) means for computing the depth value of each point on the triangle and its corresponding storage location in the depth buffer;
  (ii) means for comparing each computed depth value with the value then stored in the corresponding depth buffer storage location;
  (iii) means for replacing the corresponding depth buffer value with the computed depth value and writing the frame buffer with a background color if the computed depth value represents a position closer to the viewpoint than the stored value;
 (f) means for recomputing the depth value of each point on each polygon edge and its corresponding storage location in the depth buffer;
 (g) means for comparing said recomputed depth value with the value stored in the corresponding depth buffer storage location;
 (h) means for replacing the depth buffer value with the recomputed depth value for said polygon edge point and writing the frame buffer with a foreground color if the value then stored therein is equal to ZCLOSE or if the recomputed depth value represents a position closer to the viewpoint than the stored value.

3. A system for removing hidden lines from a wire-frame object generated for display on a display system in response to signals representing a computed depth value of a point and an X,Y coordinate of that point, said system comprising:

buffer means for storing a depth value for each point displayable on said display system, said means responsive to said X,Y coordinate to generate a stored depth value corresponding to said X,Y coordinate;

memory means for storing a value representing a depth close to a viewpoint;

first comparator means for comparing said computed depth value of a point and said stored depth value and operable to generate a first comparison signal;

second comparator means for comparing said computed depth value and the value stored in said memory means and operable to generate a second comparison signal;

controller means for controlling the placement of values in said buffer means and for controlling color output to said display system, said controller means responsive to said first and second comparison signals and operable in repetitive cycles of three phases, said controller means operable as follows:

in said first phase, if said first comparison signal indicates said computed depth value is closer to said viewpoint than the stored depth value, then signalling the storage of the value in said memory means; otherwise signalling restoring said depth value;

in said second phase, if said first comparison signal indicates said computed depth value is closer to said viewpoint than the stored depth value, then signalling the storage of said computed depth value and signalling the generation of a background color at said X,Y coordinate, otherwise signalling restoring of said stored depth value;

in said third phase, if said first comparison signal indicates said computed depth value is closer to said viewpoint than said stored depth value or said second comparison signal indicates said stored depth value is equal to the value stored in said memory means then signalling the storage of said depth value and signalling the generation of a foreground color at said X,Y coordinate, otherwise signalling restoring said stored depth value;

selector means for selecting the data value to be stored in said buffer means, receiving said computed depth value and said stored depth value, connected to said memory means and to said buffer means, and responsive to said controller means signalling of the data value to store.

4. A method for producing a wire-frame graphics display in two dimensions with hidden lines removed in a grapics display system having a depth buffer and a frame buffer, each containing a storage location for each displayable point on said display system, said display to be as it would appear from a chosen viewpoint and said display to be produced from data representing the vertices of a set of polygons defining a three dimensional object projected onto a viewplane, said method comprising the steps of:

masking the edges of each polygon from being overwritten during hidden line removal processing;

tessellating said polygon into triangles;

processing all points in each triangle to remove any hidden lines; and unmasking and processing the edges of each polygon to write a foreground color on said display system and to store the computed depth value.

* * * * *